UNITED STATES PATENT OFFICE.

WILHELM REISSIG, OF DARMSTADT, ASSIGNOR TO GEBRUEDER SCHMIDT, OF BOCKENHEIM, NEAR FRANKFORT-ON-THE-MAIN, GERMANY.

PRINTING-INK.

SPECIFICATION forming part of Letters Patent No. 265,867, dated October 10, 1882.

Application filed July 22, 1882. (No specimens.)

*To all whom it may concern:*

Be it known that I, Dr. WILHELM REISSIG, a subject of the Emperor of Germany, and resident at Darmstadt, Germany, have invented new and useful Improvements in Printing-Ink, of which the following is a specification.

The printing-ink in general use heretofore consists chiefly of lamp-black and linseed-oil varnish, and can never be thoroughly extracted from paper upon which it has been printed. The varnish can be extracted; but the lamp-black resists all chemical agents and dissolvents, and paper once printed upon with this ink can never be used for the manufacture of clean white paper again.

The object of my invention is to avoid the above defects, and to this end I do not use lamp-black for the manufacture of printing-ink, but substitute other materials which can be entirely removed from the paper by chemical agents.

In the manufacture of printing-ink according to my new and improved method I employ the black or di oxide of manganese, a substance obtained as a residue in great quantities in chemical works—for instance, in soda-manufactories.

Manganese in all its varieties, and especially the deep-black combination of oxygen and manganese, can be used. The proportions of the above-mentioned material—that is, the black or di oxide of manganese and the linseed-oil varnish—can be varied as much as desired. Preferably seventy parts, by weight, of black or di oxide of manganese are mixed with thirty parts, by weight, of linseed-oil varnish, and are then finely ground down.

In place of linseed-oil varnish, other preparations of linseed-oil may be employed, and oleine, soft soap, glycerine, gum-soaps, &c., which are also used in the manufacture of printing-ink with lamp-black, can be used.

In place of the linseed-oil varnish, I have made a solution of caseine in alkalies; or I have mixed the caseine with the above-named materials and burned magnesia. The substances used to tone the ink—for instance, such as nigrosine, &c.—which also have been used in printing-ink made heretofore, are used in my improved printing-ink for the same purpose.

Having thus described my invention, what I claim as new, and desire to secure by Letters Patent, is—

An improved printer's ink consisting, as herein described, of black or di oxide of manganese and linseed-oil varnish, as set forth.

In testimony whereof I have signed my name to this specification in the presence of two subscribing witnesses.

WILHELM REISSIG.

Witnesses:
 FRANZ WIRTH,
 FRANZ HASSLACHER.